United States Patent [19]

Warren

[11] 4,302,741

[45] Nov. 24, 1981

[54] OIL FILLED SWITCH MECHANISM AND USES THEREFORE

[75] Inventor: Jack L. Warren, Reno, Nev.

[73] Assignee: Suzi Light Corporation, Sparks, Nev.

[21] Appl. No.: 26,597

[22] Filed: Apr. 4, 1979

[51] Int. Cl.³ .......................................... H01H 67/12
[52] U.S. Cl. .................................. 335/131; 200/16 C;
 335/190
[58] Field of Search ............... 335/190, 186, 131, 126,
 335/280, 133; 200/16 C, DIG. 29, 61.89

[56] References Cited

U.S. PATENT DOCUMENTS 2,434,070 1/1948 Gross .................................. 335/190
3,937,909 2/1976 Warren ............................. 200/16 C Primary Examiner—Harold Broome
Attorney, Agent, or Firm—Blair, Brown & Kreten

[57] ABSTRACT

Disclosed herein is an improved switch mechanism suitably fashioned for providing an indicator in one embodiment of an automobile's acceleration, deceleration, or coasting. Further, a second switch mechanism which operates as a function of a command from a second circuit and its associated induction coil has been provided. In one form, the side to side translation of a bar having a contact element thereon causes electricity to be transferred from a current source or battery to two or three contact points which are selectably engageable and provide a current to the circuits associated with these engageable contacts so as to activate a circuit.

8 Claims, 13 Drawing Figures

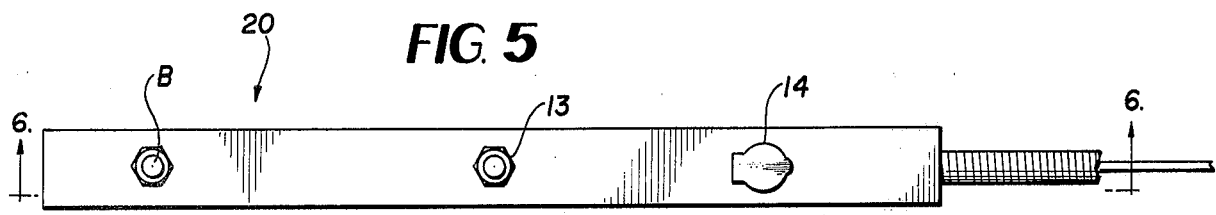
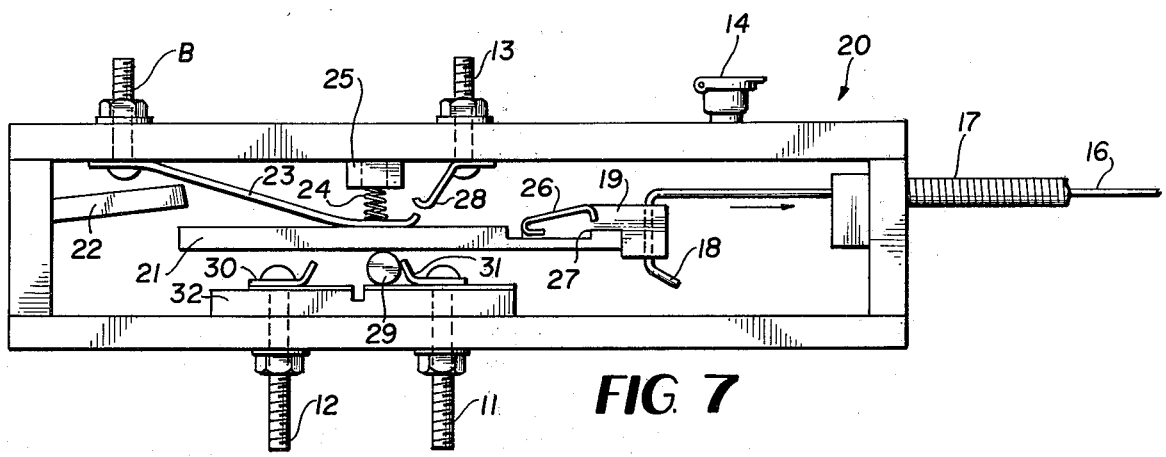
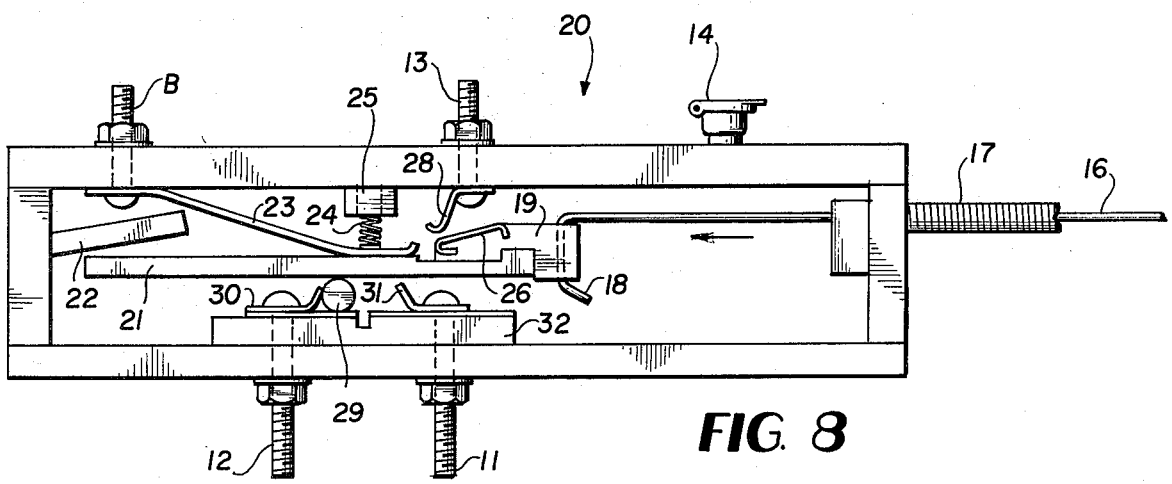

OIL FILLED SWITCH MECHANISM AND USES THEREFORE

BACKGROUND OF THE INVENTION

The ensueing specification deals with improvement over U.S. Pat. Nos. 3,596,020 and 3,937,909 said patents being held by the current inventor. In the earlier patent, the switching mechanism can be seen to be substantially different structurally from that which is now under consideration, whereas the latter patent, while more closely similar to the instant application, provides structural dissimilarities to such an extent that the current disclosure constitutes an improvement thereover and will be made manifest when considered with the ensuing specification and claims.

SUMMARY OF THE INVENTION

The instant application contemplates as an objective to provide a switch and indicator device which is durable in construction, and not subject to flickering due to dynamic vibrations disposed thereon.

An additional object contemplates providing an improved switching device which resides in an oil bath thereby prolonging the life of the contacts therein as well as minimizing any possibility of arcing.

Further objects will become apparent when considering the following detailed specification and claims.

BRIEF DESCRIPTION OF THE DRAWINGS

FIG. 5 is a top plan view of the switch mechanism associated with the light of FIGS. 1 through 4;

FIG. 6 is a sectional view taken along lines 6—6 of FIG. 5;

FIG. 7 is another view of FIG. 6 in which the contacts are in a second position;

FIG. 8 shows yet a third position of the contacts of FIG. 6;

DESCRIPTION OF THE PREFERRED EMBODIMENT

Figure 1:
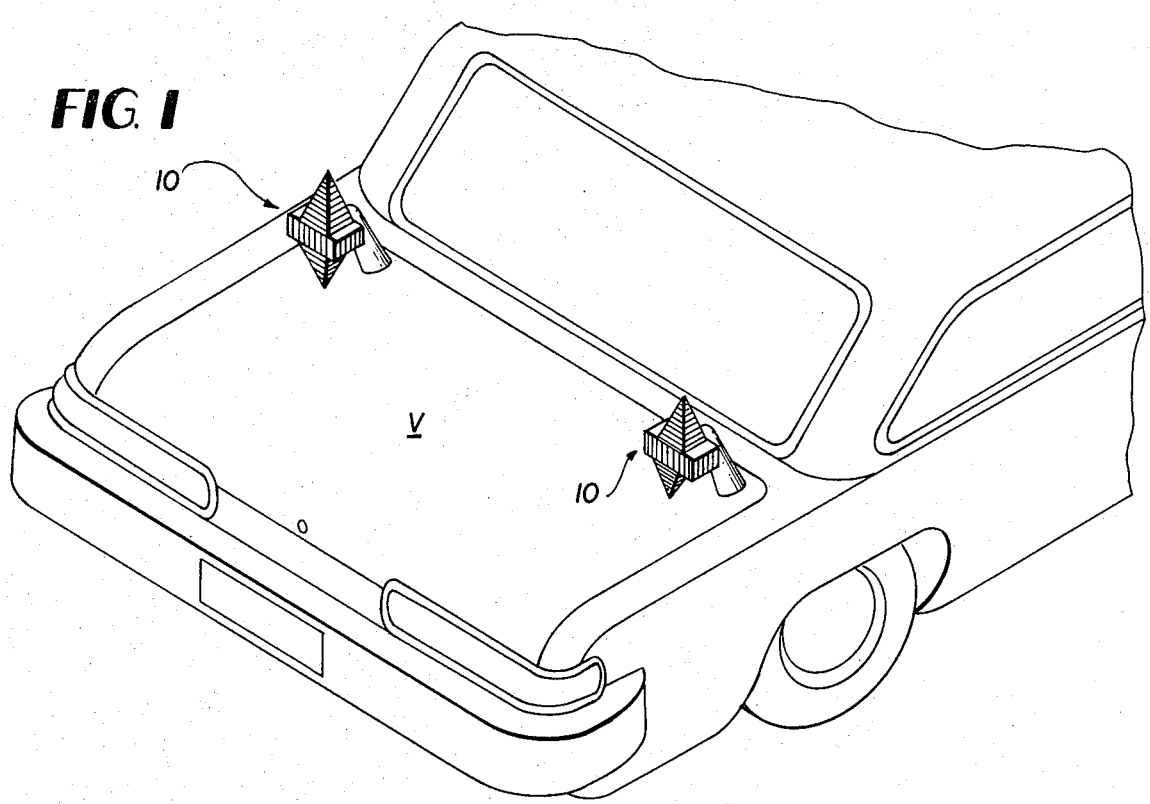
FIG. 1 is an isometric view of one application of the switching device according to the present invention.

Referring to the drawings now wherein like reference numerals refer to like parts throughout the various drawings, reference numeral 10 is directed to the light according to the present invention, reference numeral 20 is directed to one form of the switching device according to the present invention, and reference numeral 40 is directed to second and third embodiments of the switching structure.

The light 10 of FIGS. 1 through 4 may generally be regarded as having a pyramid type shape and a mirror image of the pyramid extends relatively speaking downwardly so that the entire structure may be regarded as being diamond shaped having a rectangular block portion medially disposed between the two mirror symmetrical images. Each light is supported on an appropriate part of an automobile (preferably on the back deck of an auto or other vehicle V by means of support rods 9).

Figure 2:
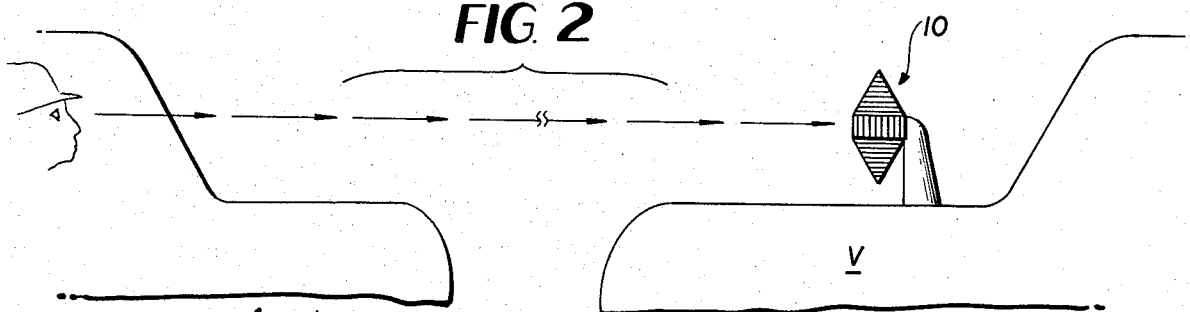
FIG. 2 depicts the light device shown in FIG. 1 in an environment especially suited for the structure.
Figure 3:
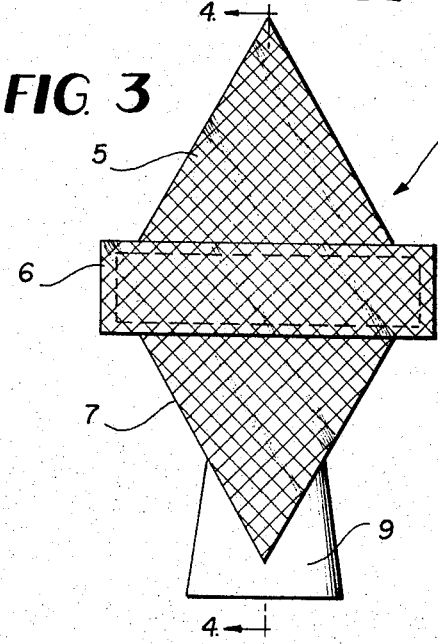
FIG. 3 is a close up view of the light switch mechanism shown in FIGS. 1 and 2.
Figure 4:
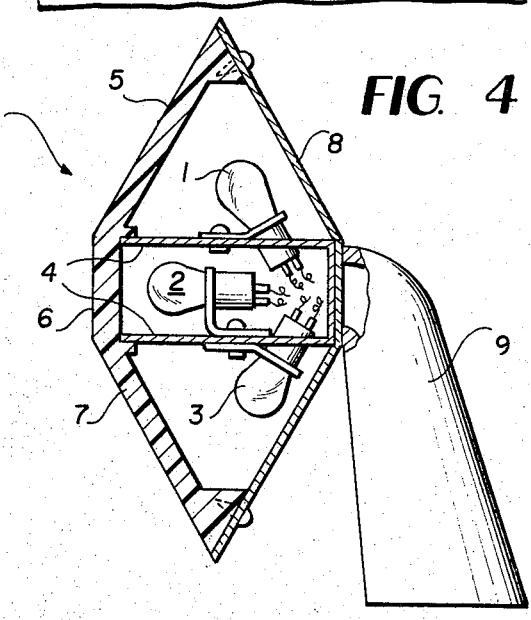
FIG. 4 is a sectional view taken along lines 4—4 of FIG. 3.
Figure 9:
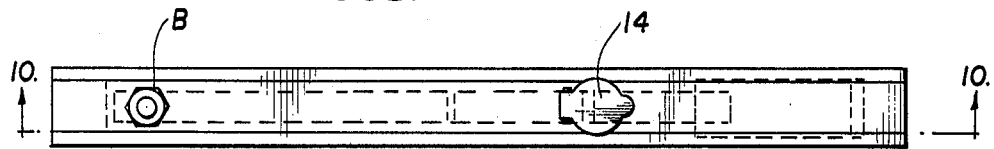
FIG. 9 is a top plan view of a second form of the invention.

FIG. 4 reveals that the light is provided with partitions 4 which separate the light into three areas, and each area is provided with lightbulbs so that the upper area has light 1, the middle area has lightbulb 2, and the lower area has lightbulb 3. The front faces of the light assembly 10 is provided with an upper diffuser 5, a medial diffuser 6, and a lower diffuser 7, and the back plate proximate to the support stand 9 is denoted by reference numeral 8. It is to be noted that the side panels of these lights provide illumination in much the same way as the front panels therefore the light has an effective visability of 330°, and it is contemplated that even the back plate could be allowed to transmit light so that the driver can be provided with an indication that these lights are in working order. FIG. 2 amply demonstrates that the light structure is suitably supported on the rear deck of a vehicle V, and its orientation is substantially in the same horizontal plane as the eye level of a following driver. It is therefore apparent that an additional indication as to the current status of the leading vehicle can provide the following vehicle more information than traditional brake lights. It is contemplated that the top portion 5 would indicate by its illumination that the driver in the lead vehicle is accelerating, while the medial portion 6 when illuminated would indicate that the driver is now coasting and not accelerating, and the lower portion would be illuminated when the leading vehicle is decelerating. It is contemplated that when the driver is in fact braking, all three indicators could be illuminated to indicate that condition.

The switch mechanism associated with the light of FIGS. 1 through 4 can be seen in one form in FIGS. 5 through 8, and reference numeral 20 is generally directed to the switch mechanism according to the present invention. This switch mechanism may generally be regarded as a hollow enclosure in which access is provided by cap member 14 which is used as an oil fill so that a cavity within the switch box 20 may be assured of being topped with oil. Extending within the cavity and projecting outwardly therefrom are terminal posts B, 11, 12, 13 wherein the B terminal provides a power input source (conveniently a battery) and terminal 11 would be connected to bulb 1, terminal 12 to bulb 2, and terminal 13 to bulb 3. Each of these terminal posts are provided with contact strips, and the contact strip associated with terminal B is strip 23, with 11 strip 31, with 12 strip 30 and with 13 strip 28. The first contact strip 23 is downwardly biased by means of spring 24 which resides in a recessed cup and is constrained therein. This cup bears numeral 25. The contact strip 23 has a planar portion underlying the contact post B, an angulated portion extending downwardly and terminates in a second horizontal portion having at its extremity remote from the battery terminal an upwardly turned lip. Contact strips 30 and 31 have planar portions and upwardly angulated terminal portions which face each other. Contact strip 28 is located on the top of the container and has a flat portion near the contact post and extends downwardly and towards the other contact strips 23, 28 and 31 and terminates in a substantially horizontal tip.

Disposed between the upper contact strips 23 and 28 and the lower strips 30 and 31 is a sliding bar 21 which has a notch 27 disposed at its extremity remote from the battery terminal B and disposed directly above the notch 27 is a fifth contact strip 26. This contact strip 26 is constrained to move with the bar element 21 and is fastened to a terminal 19 which has a bore therein through which passes a hooked loop 18 which extends out of the container and defines a rigid cable 16. The cable 16 at the point of traversing through the container 20 is provided with an oil seal 15 and outside of the cable 16 has a protective shroud 17 disposed thereover. This cable or rod 16 is capable of translation from the left to the right as shown by the arrows nearer to the inner portion of the cable and it is operatively connected to the acelerator pedal in a preferred embodiment as shown in the earlier above referenced patents.

FIG. 6 shows one position of the switch in which bulb 3 is illuminated and which provides an indication that deceleration is taking place. The fifth contact element 26 which has a substantially horizontal terminal portion proximate to notch 27, an angulated medial portion and a downwardly extending tip constrained to ride with the block terminus 19, causes the first contact strip 23 to rise upwardly and the fifth contact strip 26 bridges the gap between contact strip 28 and 23. When this situation occurs of course bulb 3 will be illuminated. FIG. 7 shows a situation in which the fifth contact element 26 is removed from the two upper contacts of FIG. 6 and the bar disposed between the upper and lower contacts, since it is provided with conductive capabilities, and, provides a transferral of current in the battery to terminal 11 which connects to the bulb 1 or the acceleration mode according to the scheme. Contact is made between the conductor bar 21 and contact 31 via conductive roller 29. FIG. 8 shows a situation in which the rod or cable 16 has moved laterally to the left slightly and in this situation, roller 29 rolls from the contact position 31 to contact strip 30 and therefore energizes the bulb 2 which indicates that coasting or the absence of acceleration and deceleration is now taking place. It is to be noted that contact strips 30 and 31 as well as roller 29 are supported on a spacer block 32 and that the conductor bar 21 is constrained from vertical upward displacement and isolation from the battery B by means of the spring 24 and protective bar 22.

FIGS. 9 through 13 indicate and provide for a two position switch in which the actuating mechanism is not the cable 16 but rather a coil 46 provided with leads 47 which extend and are operatively connected to any of a plurality of mechanisms. For example, these coils could be provided and connected to the horn of an automobile, the accelerator pedal to indicate acceleration or deceleration only, and in fact the uses thereof are not limited to an automotive environment. For example, this relay could be used in a telephone circuit as a relay which, when energized, would indicate that a phone bell is being rung, a telephone conversation is in progress or has been terminated, etc.

Figure 10:
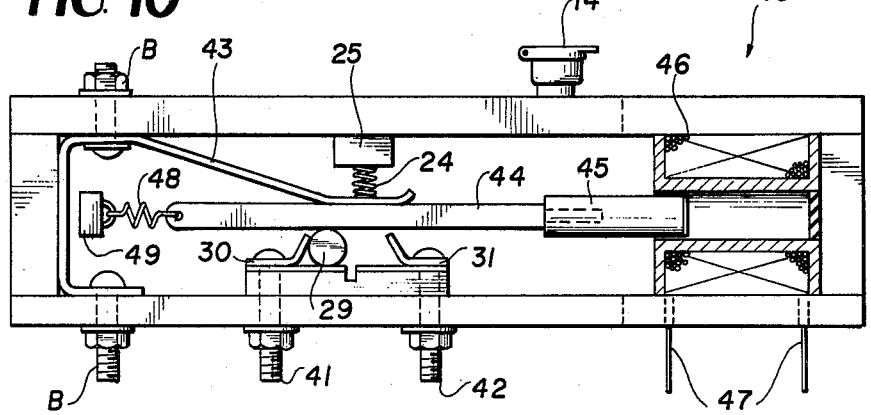
FIG. 10 is a sectional view taken along lines 10—10 of FIG. 9.
Figure 11:
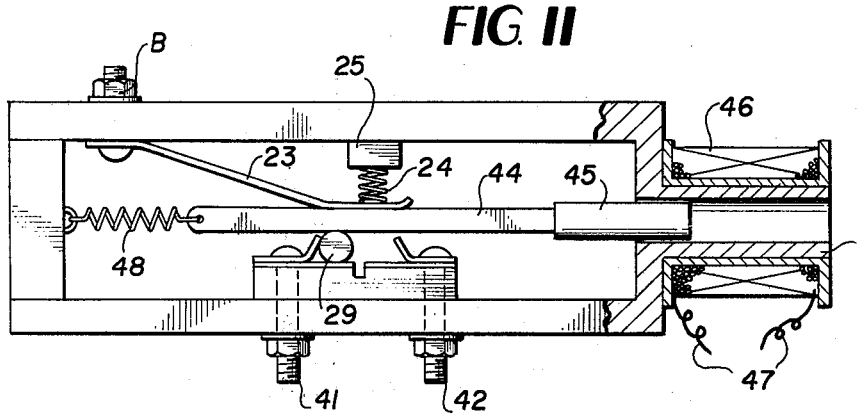
FIG. 11 shows an alternative sectional view of that defined in FIGS. 9 and 10.
Figure 12:
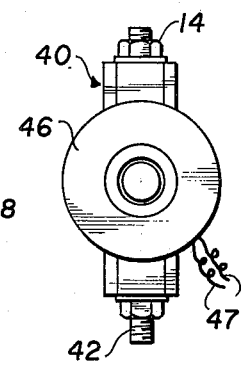
FIG. 12 is an end view of FIG. 11.
Figure 13:
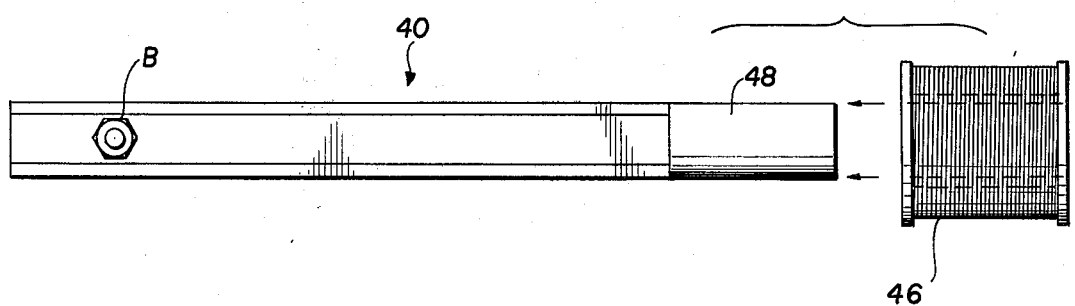
FIG. 13 is a top plan view of FIGS. 11 and 12 with a portion of the apparatus disassociated therefrom.

In any event, the coil of FIG. 10 is shown as being integral with the reservoir or container 40 and in FIGS. 11, 12 and 13 it is shown as being externally disposed.

Similar to the previous figures, an oil reservoir 14 is employed and additionally the battery terminal B is provided as well as output terminals 41 and 42. These are provided with contact strips 42, 30 and 31 respectively, and roller 29 is a conductor disposed between the two contacts 30 and 31. The conducting rod 44 is spring biased at one extremity by spring 48 and holding block 49 and at the other extremity is provided with a steel terminal point 45. The majority of the rod 44 may be made of brass or similar material and the biasing means insures the contact element 43 is downwardly directed by spring 24 and spring container 25 has been described previously.

It should be apparent therefore that the steel tip 45 will be influenced by the presence or absence of induction in the coil 46 so that energization and deenergization will cause lateral translation of contact 44 and 45 as dictated by the current. This of course will cause roller 29 to roll between the contact strip 30 and 31 so as to provide connection to terminal posts 41 and 42 as desired.

Having thus described the invention it should be apparent that numerous structural modifications are contemplated as being a part of this invention as set forth hereinabove and defined hereinbelow by the claims.

What is claimed is:

1. A switching mechanism comprising in combination a closed reservoir, oil disposed in said reservoir, a contact bar medially disposed within said reservoir in a horizontal sense, a first pair of contact elements disposed on the top of said contact bar and separated from each other and a second pair of contact elements disposed below said contact bar and similarly separated, a ball having conductive properties disposed between said second pair of contact elements and adapted to connect one of said second pair of contact elements with said contact bar, and a fifth contact element disposed on said contact bar on an upper face thereof whereby when said fifth contact element on said contact bar bridges said first pair of contact elements, said second pair of contact elements are disengaged and when said fifth contact element does not bridge said first pair of contact elements, a connection is made between one of said first pair of contact elements and one of said second pair through a conductive portion of said contact bar and said ball.

2. The device of claim 1 in which one of said upper contact elements and both of said second contact elements are connected to light bulbs, and the other of said first contact element is connected to a battery.

3. The device of claim 2 wherein said fifth contact element and said contact bar is connected to a cable which is capable of lateral translation.

4. The device of claim 3 wherein said contact bar is provided with a notched portion in which said fifth contact element rides.

5. A switch mechanism comprising a container, an oil reservoir in said container, an upper contact having biasing means and connected to a current source, a contact bar below said upper contact, and a pair of contact elements below said contact bar and separated from each other, a conductive ball between said pair of contact elements, biasing means at one extremity of said contact bar and coaxial therewith, and electromagnetic means at an opposed extremity whereby when said electromagnet is energized, said contact bar will translate laterally in one direction and said ball will complete a circuit with one of said pair of contact elements and said bar, and when said electromagnetic means is deenergized, said contact bar will return to a rest position by the force of said biasing means and said ball will energize the other of said pair of contact elements.

6. The device of claim 5 in which said electromagnetic means is a steel tip at the extremity of the conductor bar opposite from said biasing means, further in which said electromagnetic means includes a coil.

7. The device of claim 6 in which said coil is within the reservoir.

8. The device of claim 6 in which the coil is outside of the reservoir.

* * * * *